United States Patent [19]
Courtemanche

[11] Patent Number: 5,415,470
[45] Date of Patent: May 16, 1995

[54] CLIP FOR SNOWMOBILE TRACK AND SNOWMOBILE TRACK PROVIDED WITH THE SAME

[75] Inventor: Denis Courtemanche, Richmond, Canada

[73] Assignee: Centre de Recherches Camoplast Inc., Sherbrooke, Canada

[21] Appl. No.: 177,261

[22] Filed: Jan. 4, 1994

[51] Int. Cl.⁶ .............................. B62D 55/18
[52] U.S. Cl. ........................ 305/38; 305/14; 305/35 EB
[58] Field of Search ........... 305/16, 24, 35 R, 35 EB, 305/56, 38, 14; 384/13

[56] References Cited

U.S. PATENT DOCUMENTS

| | | | |
|---|---|---|---|
| 2,343,533 | 3/1944 | Burnham | 384/13 |
| 3,550,968 | 12/1970 | Rymes | 305/54 |
| 3,722,961 | 3/1973 | Haley et al. | 305/38 X |
| 3,774,979 | 11/1973 | Harris | 305/24 |
| 3,799,626 | 3/1974 | Kilbane, Jr. | 305/35 EB |
| 3,887,243 | 6/1975 | Chaumont | 305/24 |
| 4,023,865 | 5/1977 | Morissette | 305/35 EB |
| 4,217,006 | 8/1980 | Dehnert | 305/35 EB |
| 4,279,449 | 7/1981 | Martin et al. | 305/35 EB |
| 4,474,414 | 10/1984 | Tokue | 305/35 EB |
| 4,795,221 | 1/1989 | Simmons | 305/35 EB |
| 4,974,970 | 12/1990 | Sugita et al. | 384/13 X |
| 4,991,911 | 2/1991 | Blais | 305/24 |
| 5,267,796 | 12/1993 | Nonaka et al. | 384/13 X |

FOREIGN PATENT DOCUMENTS 143457  8/1980  Germany .............................. 384/13

OTHER PUBLICATIONS

Advertising document of Parts Unlimited published in Snowmobile Business (no date).

*Primary Examiner*—Russell D. Stormer
*Attorney, Agent, or Firm*—Kriegsman & Kriegsman

[57] ABSTRACT

A clip and a guide clip for snowmobile track of the type having to cooperate with a snowmobile slide suspension, the clip being obtained from a single sheet of metal and comprising a main portion having a bearing surface against which a corresponding slider shoe of the snowmobile slide suspension may be applied. It equally comprises two curved wings for fastening the main portion to the snowmobile track, and at least one depression provided in the bearing surface.

10 Claims, 4 Drawing Sheets

CLIP FOR SNOWMOBILE TRACK AND SNOWMOBILE TRACK PROVIDED WITH THE SAME

FIELD OF THE INVENTION

The present invention relates to a new and improved clip or guide clip for snowmobile track belts and to a snowmobile track belt equipped with such clips.

DESCRIPTION OF THE PRIOR ART

Snowmobile track belts are normally provided with a series of sheet metal clips extending at spaced intervals in two transversely separated rows positioned to engage the underside of the slide rails, especially the slider shoes of said rails, of a snowmobile suspension system in sliding bearing contact with the bearing surface of said clips.

U.S. Pat. No. 4,023,865 discloses the use of clips to protect track belt from failure resulting from a high friction generated between the track belts and a slider shoe of slide elements of a slide suspension. Those clips have a bearing surface and a guiding flange. Each clip is fixed on the track by four teeth piercingly penetrating through the material of the track and grippingly engaging it.

U.S. Pat. No. 3,887,243 discloses a clip assembly comprising a main body that is snap fitted on a cleat which is itself mounted on a reinforcing member of an endless track belt. Furthermore, the body has a bearing surface where a corresponding rail of a slide suspension system may ride, and two lateral wings extending from the opposite side edges thereof not only for guiding the endless track with respect to said rails but also to serve as heat dissipators.

U.S. Pat. Nos. 4,217,006, 4,474,414 and 4,991,911 disclose guide clips of the type provided with a L-shaped guide section and a smooth bearing surface.

It is to be noted that all the prior art clips are provided with a bearing surface that is completely smooth and that all improvements to said clip are generally for strengthening the guide part or to ameliorate the guidance, except with the guide clip of U.S. Pat. No. 3,887,243 where guide members are further intended to work as heat dissipator.

SUMMARY OF THE INVENTION

The applicant has found that is was possible to reduce the friction existing between the slider shoe of a slide suspension system and the bearing surface of clips and guide clips thanks to a film of water generated between them.

More particularly, the present invention related to an improved configuration for the bearing surface of a clip or guide clip for snowmobile track belt, to allow a longer useful life for slider shoes of a slide suspension system and to obtain improved performance for the snowmobile.

In particular, the invention related to a clip for snowmobile track of the type having to cooperate with a snowmobile slide suspension, said clip being obtained from a single sheet of metal and comprising:

a main portion having a bearing surface against which a corresponding slider shoe of the snowmobile slide suspension may be applied;

means for fastening said main portion to the snowmobile track, and at least one depression provided in the bearing surface.

Advantageously, the invention relates to a clip further comprising an integral guide log which may preferably project outwardly from one end of the main portion to contribute to maintain the track belt in alignment with a corresponding slider shoe.

Preferably, the film of water is generated when the track is running in the snow. Indeed, the snow may accumulate in said depression of the bearing surface of each clip (or guide clip) and melt therein because the heat resulting from the friction existing between the bearing surface of said clip (or guide clip) and its corresponding slider shoe of the slide suspension system. It appears that it is the fluidity of the water resulting from the melt of the snow associated with the motion of the track belt in snow that allows the creation of a film of water on the whole bearing surface of the clip or guide clip.

A particularly preferred embodiment of the invention is an oblong and elongated shape for at least one or preferably each depression provided in the bearing surface of the clip or guide clip. Such a shape appears to make easier the introduction of snow therein.

An other preferred embodiment according to the invention is a clip or a guide clip where three identical depressions are provided in the bearing surface, each depression being further provided with a longitudinal axis that is oriented to be substantially parallel with respect to the displacement direction of the snowmobile track belt.

The invention is also concerned with a snowmobile track belt provided with at least one clip or guide clip according to the invention.

DESCRIPTION OF A PREFERRED EMBODIMENT OF THE INVENTION

Figure 8:
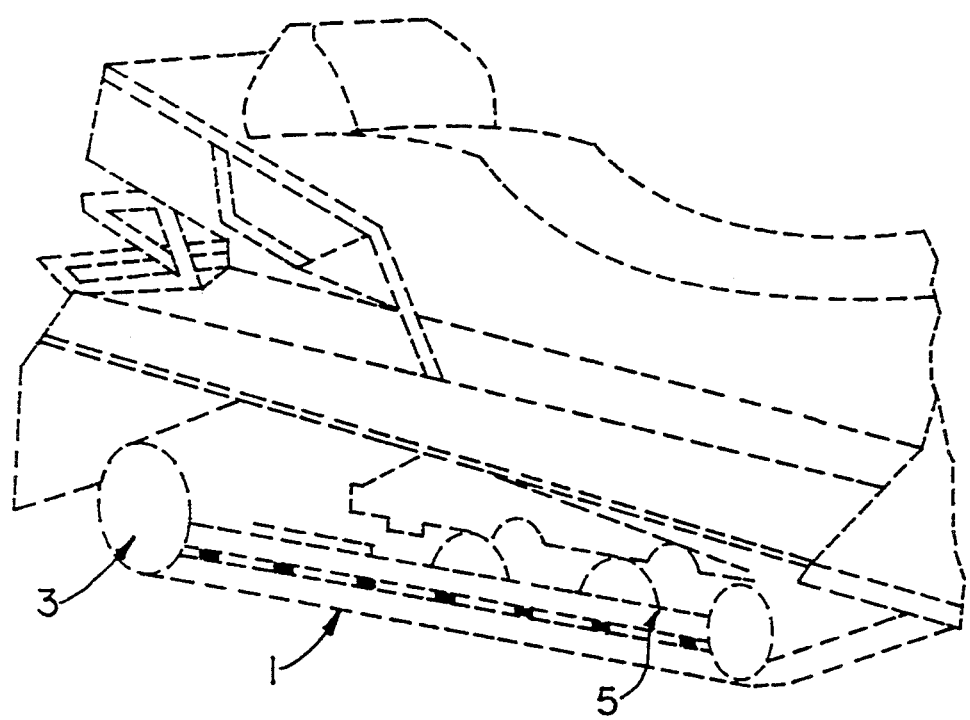
FIG. 8 is a schematic diagram of the rear part of a snowmobile.

A rear part of a snowmobile is illustrated in the schematic diagram of FIG. 8. It comprises as usual a track system including an endless track belt 1 which is powered according to known manner. This endless track belt 1 is more particularly mounted on two sprocket wheels 3 (only the rear one is illustrated) each provided with two sets of teeth, one of said wheel being mechanically connected to usual power means. The track system further comprises a slide suspension system 5 that cooperates with clips 7 and guide clips 9 provided on said endless track belt 1 to maintain this latter in proper alignment with slider shoes 11 of said slide suspension system 5.

The track belt 1 is preferably made with usual flexible material, such as rubber, eventually reinforce with usual reinforcing means such as steel rods. As well known in the art, the external surface of the track shows treads 2 to improve the traction of the track in the snow. Clips 7 and guide clips 9 are extending at spaced intervals there the track in two traversal separated rows to engage corresponding slider shoes 11.

More particularly, the invention relates to improved clips 7 and guide clips 9 that can be mounted on the aforesaid endless track belt 1 for snowmobile. These clips 7 and guide clips 9 may be mounted on the track belt 1 like prior art clips and guide clips. Advantageously, the clip 7 and the guide clip 9 have the following particulars.

Figure 1:
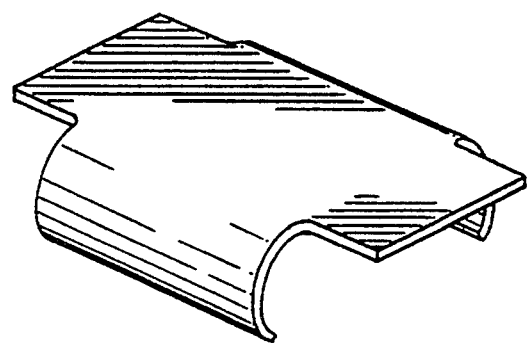
FIG. 1 is a perspective view of a conventional snowmobile clip.
Figure 2:
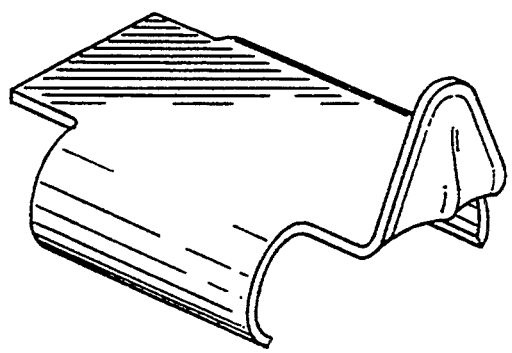
FIG. 2 is a perspective view of a conventional snowmobile guide clip.
Figure 3:
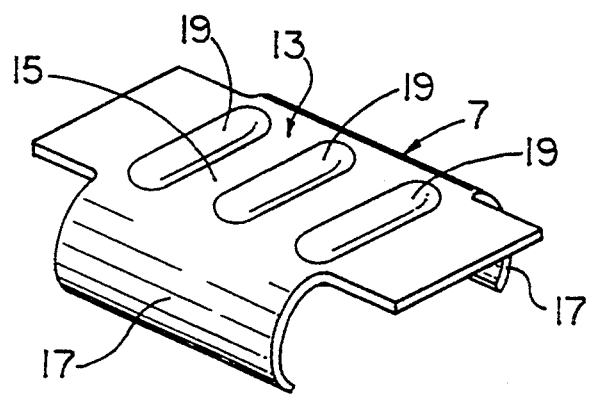
FIG. 3 is a preferred embodiment of a snowmobile clip according to the invention.
Figure 4:
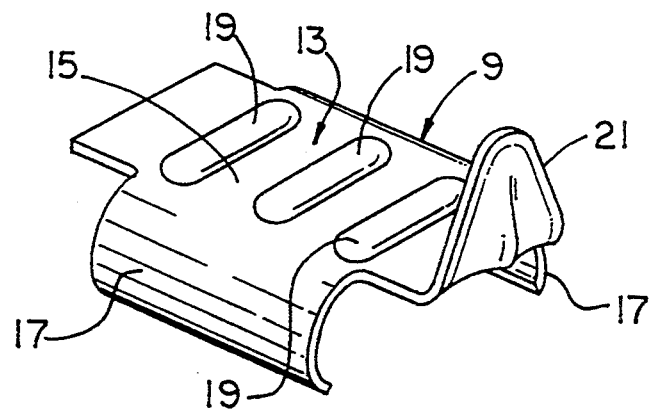
FIG. 4 is a preferred embodiment of a snowmobile guide clip according to the invention.
Figure 7:
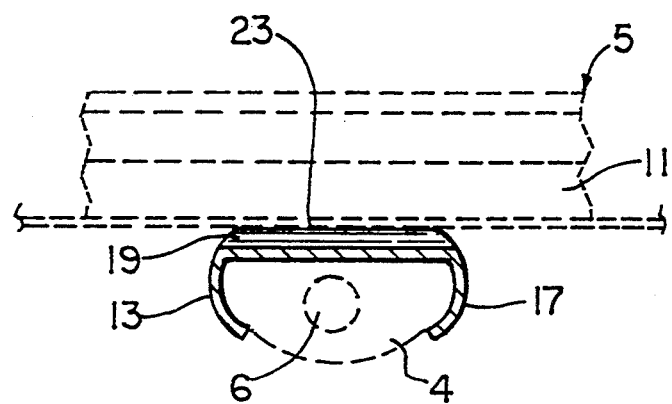
FIG. 7 is an enlarged cross-sectional view of a clip according to line VII—VII in FIG. 5, when in contact with a slider shoe of a corresponding slide rail.

The clip 7 as well as the guide clip 9 comprises, as particularly illustrated in respectively FIG. 3 and FIG. 4, a main portion 13 provided with a bearing surface 15 and, from each side of it, two curved wings 17 allowing to fasten said clips and guide clips on the track belt of the snowmobile as shown in FIG. 7.

Preferably, clips 7 and guide clips 9 are mounted on the track 1 according to methods used for prior art clips and guide clips, especially with tools that deform and press wings 17 on and against the track belt portion 4 (see FIG. 7) separating apertures 8 intended to be engaged by corresponding teeth of said sprocket wheels 3. As illustrated in FIG. 7, the track belt 1 may be reinforce with reinforcing means such as steel rod 6 housed in the portion 4 of the track belt 1.

According to the invention these clips 7 and guide clips 9 (see FIGS. 3 and 4) are provided in their bearing surface 15, with three identical depressions 19, each of said depression advantageously having an oblong and elongated shape. These depressions 19 are preferably provided with a longitudinal axis oriented to be parallel with respect to the displacement direction of the snowmobile track belt 1 (see FIG. 5).

Figure 6:
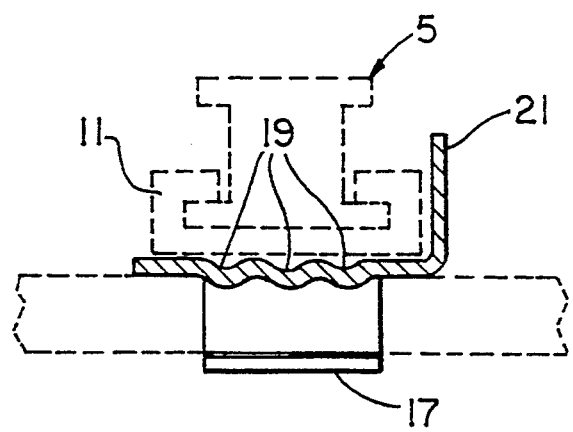
FIG. 6 is an enlarged cross-sectional view of a guide clip according to line VI—VI in FIG. 5, when in contact with a slider shoe of a corresponding slide rail.

As known in the art, the guide clip 9 of FIG. 4 may be provided with an integral guide log 21. FIG. 6 shows that said guide clip 9 contribute to maintain the track belt 1 in proper alignment with corresponding slider shoes 11 even when the snowmobile change of direction or rides on a hillside.

These clips 7 and guide clips 9 may be made from a single suitable sheet of metal material such as steel, especially stainless steel, and could be easily obtained by usual methods like die-cutting and stamping executed by well known tools.

Snow may accumulate in said depressions 19 when the endless track belt 1 is running in snow, and the heat resulting from the friction between the bearing surface 15 of said clip 7 or guide clip 9 and the corresponding slider shoe 11 of the sliding suspension system 5 generate a film of water 23 that lubricate the contact between the slider shoe 11 and the bearing surface 15 of the clips 7 and guide clips 9.

Figure 5:
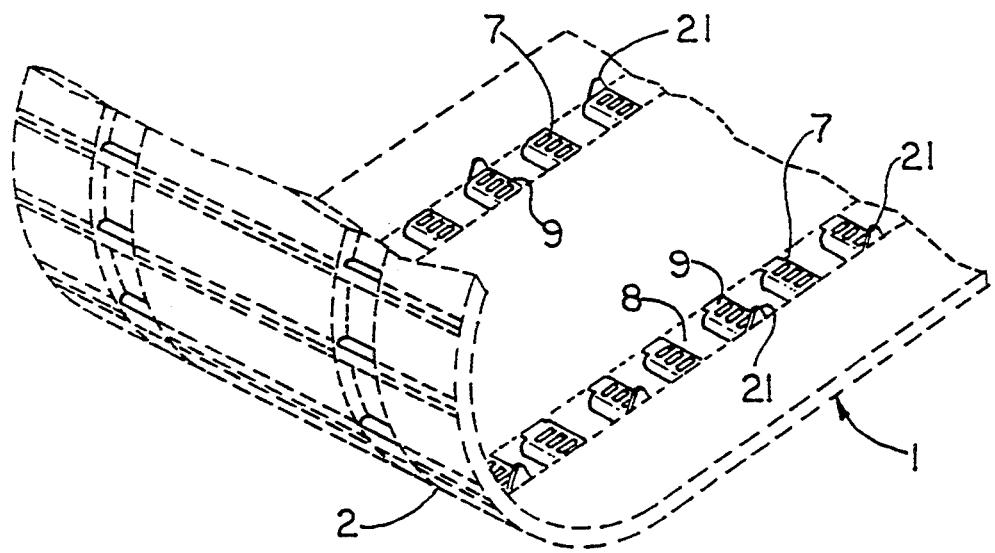
FIG. 5 is a perspective view of a portion of an endless track belt according to the invention, with clips and guide clips of FIG. 3 and FIG. 4 mounted thereon.

From the foregoing description of the invention certain modifications may be readily apparent. For example the number and the disposition of depressions in the clips and guide clips, the general shape of said clips and guide clips. Also, the number and the shape of the guide log could be different. Likewise the alternative disposal of clip and guide clip which is shown in FIG. 5 is only an example among a lot of possible combinations.

The embodiments of the invention in which an exclusive property or privilege is claimed are defined as follows:

1. A clip for snowmobile track of the type having to cooperate with a snowmobile slide suspension, said clip being obtained from a single sheet of metal and comprising:
   a main portion having a bearing surface against which a corresponding slider shoe of the snowmobile slide suspension is to be applied;
   means for fastening said main portion to the snowmobile track, and
   at least one depression entirely provided in the bearing surface.

2. A clip according to claim 1, wherein it further comprises an integral guide log projecting outwardly from one end of the main portion to contribute to maintaining the track belt in alignment with a corresponding slider shoe.

3. A clip according to claim 1, wherein the depression has an oblong and elongated shape.

4. A clip according to claim 2, wherein the depression has an oblong and elongated shape.

5. A snowmobile track belt comprising at least one clip as claimed in claim 1, 2, 3, or 4.

6. A clip for snowmobile track of the type having to cooperate with a snowmobile slide suspension, said clip being obtained from a single sheet of metal and comprising:
   a main portion having a bearing surface against which a corresponding slider shoe of the snowmobile slide suspension is to be applied;
   means for fastening said main portion to the snowmobile track; and
   three identical depressions provided in the bearing surface, each of said three identical depressions having an oblong and elongated shape and being provided with a longitudinal axis and wherein said depressions are oriented to have their longitudinal axes substantially parallel with respect to the displacement direction of the snowmobile track.

7. A clip for snowmobile track of the type having to cooperate with a snowmobile slide suspension, said clip being obtained from a single sheet of metal and comprising:
   a main portion having a bearing surface against which a corresponding slider shoe of the snowmobile slide suspension is to be applied;
   an integral guide log projecting outwardly from one end of the main portion to contribute to maintaining the track belt in alignment with a corresponding slider shoe;
   means for fastening said main portion to the snowmobile track; and
   three identical depressions provided in the bearing surface, each of said three identical depressions having an oblong and elongated shape and being provided with a longitudinal axis and wherein said depressions are oriented to have their longitudinal axes substantially parallel with respect to the displacement direction of the snowmobile track.

8. A snowmobile track belt comprising at least one clip for snowmobile track of the type having to cooperate with a snowmobile slide suspension, said clip being obtained from a single sheet of metal and comprising:
   a main portion having a bearing surface against which a corresponding slider shoe of the snowmobile slide suspension is to be applied;

means for fastening said main portion to the snowmobile track; and three identical depressions provided in the bearing surface, each of said three identical depressions having an oblong and elongated shape and being provided with a longitudinal axis and wherein said depressions are oriented to have their longitudinal axes substantially parallel with respect to the displacement direction of the snowmobile track.

9. A snowmobile track belt comprising at least one clip for snowmobile track of the type having to cooperate with a snowmobile slide suspension, said clip being obtained from a single sheet of metal and comprising:

a main portion having a bearing surface against which a corresponding slider shoe of the snowmobile slide suspension is to be applied;

an integral guide log projecting outwardly from one end of the main portion to contribute to maintaining the track belt in alignment with a corresponding slider shoe;

means for fastening said main portion to the snowmobile track; and three identical depressions provided in the bearing surface, each of said three identical depressions having an oblong and elongated shape and being provided with a longitudinal axis and wherein said depressions are oriented to have their longitudinal axes substantially parallel with respect to the displacement direction of the snowmobile track.

10. A clip for snowmobile track of the type having to cooperate with a snowmobile slide suspension, said clip being obtained from a single sheet of metal and comprising:

a main portion having a bearing surface against which a corresponding slider shoe of the snowmobile slide suspension is to be applied;

means for fastening said main portion to the snowmobile track, and a depression provided in the bearing surface, said depression having a longitudinal axis substantially parallel with respect to the displacement direction of the snowmobile track.

* * * * *